US012040119B2

(12) United States Patent
Hashimoto

(10) Patent No.: US 12,040,119 B2
(45) Date of Patent: Jul. 16, 2024

(54) WINDING CORE AND COIL COMPONENT

(71) Applicant: Murata Manufacturing Co., Ltd., Kyoto-fu (JP)

(72) Inventor: Kenji Hashimoto, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 581 days.

(21) Appl. No.: 17/198,974

(22) Filed: Mar. 11, 2021

(65) Prior Publication Data

US 2021/0287840 A1 Sep. 16, 2021

(30) Foreign Application Priority Data

Mar. 12, 2020 (JP) ................................ 2020-043234

(51) Int. Cl.

| | |
|---|---|
| ***H01F 27/24*** | (2006.01) |
| ***H01F 27/28*** | (2006.01) |
| ***H01F 27/29*** | (2006.01) |
| ***H01F 41/02*** | (2006.01) |

(52) U.S. Cl.

CPC ......... *H01F 27/24* (2013.01); *H01F 27/2823* (2013.01); *H01F 27/29* (2013.01); *H01F 41/0246* (2013.01)

(58) Field of Classification Search

CPC ...... H01F 27/24; H01F 27/2823; H01F 27/29; H01F 41/0246; H01F 3/08; H01F 27/306; H01F 17/045; H01F 27/26

See application file for complete search history.

(56) References Cited

U.S. PATENT DOCUMENTS

2005/0052267 A1* 3/2005 Singu .................... H01F 27/292 336/83
2017/0330676 A1* 11/2017 Uchida ................. H01F 27/292
2018/0019046 A1* 1/2018 Miyamoto ................ H01F 3/14
2018/0261380 A1* 9/2018 Igarashi .............. H01F 27/2828
2020/0105451 A1* 4/2020 Horie .................... H01F 27/266
2021/0065967 A1* 3/2021 Oga ........................ H01F 41/10

FOREIGN PATENT DOCUMENTS

CN 107369532 A 11/2017
CN 108573793 A 9/2018
CN 109494051 A 3/2019
JP 2018-148080 A 9/2018

* cited by examiner

*Primary Examiner* — Mang Tin Bik Lian
(74) *Attorney, Agent, or Firm* — Studebaker & Brackett PC

(57) ABSTRACT

A winding core includes a winding core portion extending in a length direction; and first and second flange portions respectively provided at first and second end portions of the winding core portion in the length direction, and each having a bottom surface, a top surface on a side opposite to the bottom surface, an inner end surface facing the winding core portion side, and an outer end surface on a side opposite to the inner end surface, with a convex step portion on the top surface side of the outer end surface. The winding core portion has an upper surface facing substantially the same direction as a direction in which the top surface faces. A first straight line passing through the top surface and a second straight line passing through the upper surface intersect outside the outer end surface at an angle of from 0.3 degrees to 5 degrees.

20 Claims, 5 Drawing Sheets

WINDING CORE AND COIL COMPONENT

CROSS-REFERENCE TO RELATED APPLICATION

This application claims benefit of priority to Japanese Patent Application No. 2020-043234, filed Mar. 12, 2020, the entire content of which is incorporated herein by reference.

BACKGROUND

Technical Field

The present disclosure relates to a winding core for winding a wire in a coil component and a coil component including the winding core, and more particularly to a form of a winding core made of ceramics.

Background Art

Technology of interest for the disclosure is described in, for example, Japanese Patent Application Laid-Open No. 2018-148080. FIG. 5 illustrates a coil component 1 described in Japanese Patent Application Laid-Open No. 2018-148080.

With reference to FIG. 5, the coil component 1 constitutes, for example, a common mode choke coil, and includes a winding core 5. The winding core 5 has a winding core portion 2 extending in a length direction L, and a first flange portion 3 and a second flange portion 4 respectively provided at a first end portion and a second end portion of the winding core portion 2 in the length direction L. The coil component 1 may further include a top plate 6 passed between the first flange portion 3 and the second flange portion 4.

In FIG. 6, only the winding core 5 in the coil component 1 illustrated in FIG. 5 is illustrated alone. The winding core 5 is made of ceramics such as ferrite or alumina. The top plate 6 is also preferably made of ceramics such as ferrite or alumina.

With reference to FIGS. 5 and 6, each of the first flange portion 3 and the second flange portion 4 has a bottom surface 7 that faces a mounting board side at the time of mounting: a top surface 8 on a side opposite to the bottom surface 7: an inner end surface 9 that faces the winding core portion 2 side; and an outer end surface 10 on a side opposite to the inner end surface 9. The top plate 6 is joined to the top surface 8 of each of the first flange portion 3 and the second flange portion 4 by an adhesive.

The coil component 1 includes a first wire 13 and a second wire 14 which are spirally wound around the winding core portion 2. The second wire 14 is not illustrated in FIG. 5, but is denoted by the reference numeral "14" for convenience of description. Further, in FIG. 5, only an end portion of the first wire 13 is illustrated, and the illustration of the wires 13 and 14 on the winding core portion 2 is omitted.

The coil component 1 further includes a first terminal electrode 15, a second terminal electrode 16, a third terminal electrode 17, and a fourth terminal electrode 18. Although not illustrated, the fourth terminal electrode 18 is denoted by the reference numeral "18" for convenience of description. Among these terminal electrodes 15 to 18, the first terminal electrode 15 and the third terminal electrode 17 are attached to the first flange portion 3 with an adhesive interposed therebetween, and the second terminal electrode 16 and the fourth terminal electrode 18 are attached to the second flange portion 4 with an adhesive interposed therebetween.

Focusing on the outer end surface 10 of the first flange portion 3, a convex step portion 23 is provided on the top surface 8 side. Also on the outer end surface 10 of the second flange portion 4, a convex step portion 23 is provided on the top surface 8 side. A stepped surface 24 formed by the step portion 23 is higher than a region other than a region where the step portion 23 is provided on the outer end surface 10, that is, is located to protrude in the length direction L, so that a base portion 19 of each of the terminal electrodes 15 to 18 does not protrude from the flange portions 3 and 4 in the length direction L of the winding core portion 2.

SUMMARY

The winding core 5 is manufactured by applying dry pressure molding using ceramic powders as a molding material. That is, the winding core 5 is manufactured by respective processes in which a die provided with a penetrating cavity that has a shape corresponding to an outer shape of the winding core 5 is prepared: the cavity is filled with ceramic powders as the molding material: the molding material is pressure-molded by inserting an upper punch and a lower punch into the penetrating cavity respectively from above and below: and an obtained molded body is fired in a baking furnace to obtain a sintered body.

In the pressure molding process described above, in a case where the step portion 23 is provided on the outer end surface 10 of each of the flange portions 3 and 4 as in the winding core 5 illustrated in FIGS. 5 and 6, the compressibility of the molding material at the step portion 23 is higher than the compressibility of the portions of the flange portions 3 and 4 other than the step portion 23. Therefore, it was found that a difference occurs in the powder density in the molded body, that is, the molding density, corresponding to the difference in the compressibility. In particular, it was found that there was a relatively large difference in molding density between the outer end surface 10 side and the inner end surface 9 side such that the molding density is higher on the outer end surface 10 side where the step portion 23 is located in each of the flange portions 3 and 4, and the molding density is lower on the inner end surface 9 side which is close to the winding core portion 2 side. This tendency appears more strongly on the top surface 8 side than on the bottom surface 7 side of each of the flange portions 3 and 4.

Then, due to this, when the step of firing the molded body is carried out, that is, when the molded body is sintered to become a sintered body, there is also a difference in contraction force between the inner end surface 9 side and the outer end surface 10 side of each of the flange portions 3 and 4. As a result, the balance of stress distribution in the sintered body may be lost, and unintended deformation may occur especially in the flange portions 3 and 4 of the winding core 5 after sintering. More specifically, the flange portions 3 and 4 may be deformed such that the top surface 8 of each of the flange portions 3 and 4 approaches the winding core portion 2, that is, the top surface 8 of the first flange portion 3 and the top surface 8 of the second flange portion 4 approach each other.

The unintended deformation of the flange portions 3 and 4 as described above not only causes variation the outer shape of the winding core 5, but also has an undesired effect on the physical properties and electrical characteristics of the winding core 5.

Therefore, the present disclosure provides a form that can have an effect of preventing undesired deformation of the winding core which is made of ceramics and has a convex step portion on the top surface side of the outer end surface of the flange portion.

Also, the present disclosure provides a winding type coil component including the above-described winding core.

The disclosure is directed to a winding core that is made of ceramics and includes a winding core portion extending in a length direction: and a first flange portion and a second flange portion which are respectively provided at a first end portion and a second end portion of the winding core portion in the length direction.

Each of the first flange portion and the second flange portion has a bottom surface that faces a mounting board side at a time of mounting, a top surface on a side opposite to the bottom surface, an inner end surface that faces the winding core portion side, and an outer end surface on a side opposite to the inner end surface, and a convex step portion is provided on the top surface side of the outer end surface.

The winding core portion has an upper surface facing substantially the same direction as a direction in which the top surface faces.

Accordingly, in the disclosure, when viewed on a virtual plane in which a central axis of the winding core portion is located and which extends in a direction orthogonal to the bottom surface, a first straight line passing through the top surface and a second straight line passing through the upper surface intersect outside the outer end surface at an angle of 0.3 degrees or more and 5 degrees or less (i.e., from 0.3 degrees to 5 degrees).

The disclosure is also directed to a winding type coil component including the above-described winding core.

The winding type coil component according to the disclosure includes, in addition to the above-described winding core, a wire wound around the winding core portion, and a terminal electrode which is provided on each of the first flange portion and the second flange portion, and to which an end portion of the wire is connected.

According to the disclosure, as described above, since the top surface of the flange portion has a predetermined inclination with respect to the central axis of the winding core portion, it is possible to increase the molding density on the inner end surface side on the top surface side of the flange portion when dry pressure molding using ceramic powders as a molding material is performed. As a result, the molding density on the inner end surface side on the top surface side of the flange portion can be made close to the molding density on the outer end surface side. Therefore, when a molded body, which should be the winding core, is sintered to become a sintered body, the difference between the contraction force on the inner end surface side and the contraction force on the outer end surface side of the flange portion is small, and therefore, it is possible to prevent undesired deformation of the winding core provided with the step portion on the outer end surface of the flange portion.

DETAILED DESCRIPTION

Figure 1:
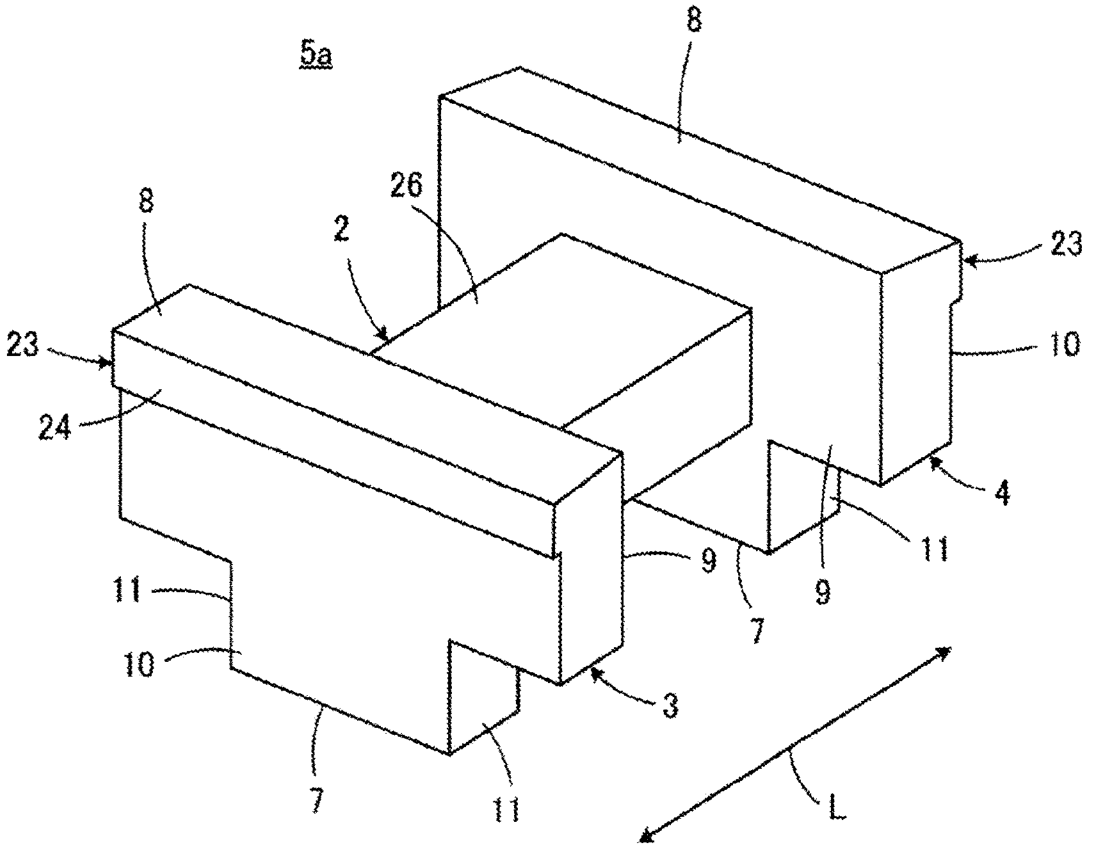
FIG. 1 is a perspective view illustrating the appearance of a winding core according to a first embodiment of the disclosure.
Figure 5:
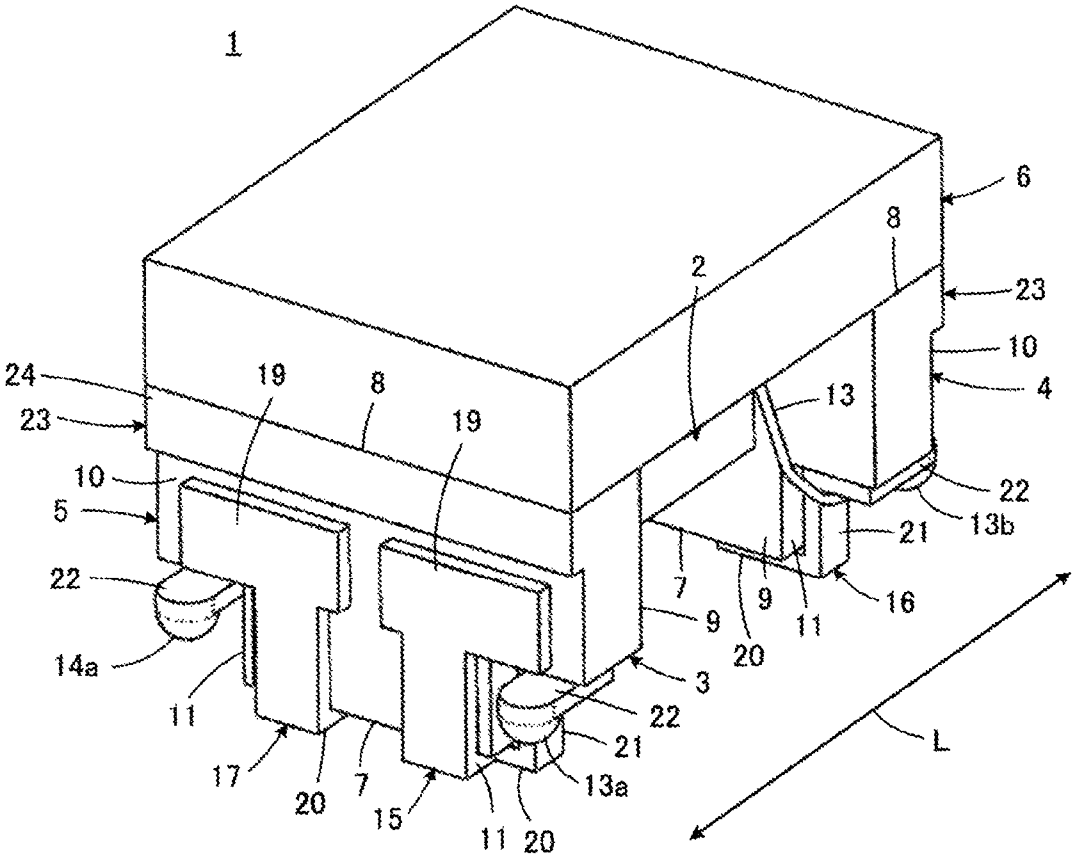
FIG. 5 (PRIOR ART)
FIG. 5 is a perspective view illustrating a coil component described in Japanese Patent Application Laid-Open No. 2018-148080.
Figure 6:
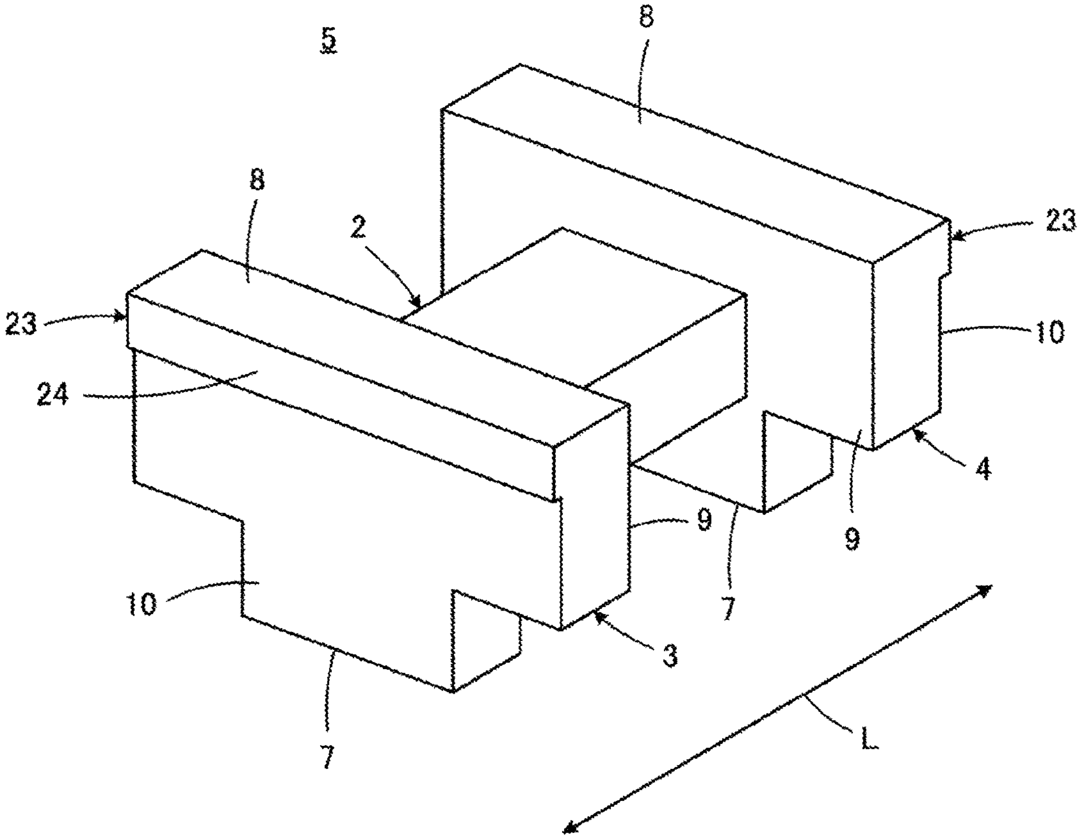
FIG. 6 (PRIOR ART)
FIG. 6 is a perspective view illustrating the appearance of the winding core included in the coil component illustrated in FIG. 5.

As described above, FIG. 5 illustrates a coil component 1 described in Japanese Patent Application Laid-Open No. 2018-148080, but in the coil component 1 illustrated in FIG. 5, a winding core 5 is replaced with a winding core 5*a* illustrated in FIG. 1, which becomes a coil component according to an embodiment of the disclosure. Therefore, with reference to FIG. 5 in addition to FIGS. 1 and 2, the winding core 5*a* and the coil component including the winding core 5*a* according to the first embodiment of the disclosure will be described. In the following description, the same reference numerals as the reference numerals illustrated in FIG. 5 are used for the elements corresponding to the elements illustrated in FIG. 5.

Also in the first embodiment of the disclosure, the coil component constitutes, for example, a common mode choke coil, and includes the winding core 5*a*. The winding core 5*a* has a winding core portion 2 extending in a length direction L, and a first flange portion 3 and a second flange portion 4 respectively provided at a first end portion and a second end portion of the winding core portion 2 in the length direction L. The coil component 1 may further include a top plate 6 passed between the first flange portion 3 and the second flange portion 4.

The winding core 5*a* is made of a sintered body of ceramics such as ferrite or alumina. The top plate 6 is also preferably made of a sintered body of ceramics such as ferrite or alumina. However, the winding core 5*a* may be composed of a sintered body such as glass or Willemite, other than ferrite or alumina. The same applies to the top plate 6.

With reference to FIG. 1, similar to the winding core 5, in the winding core 5*a*, each of the first flange portion 3 and the second flange portion 4 has a bottom surface 7 that faces a mounting board side at the time of mounting: a top surface 8 on a side opposite to the bottom surface 7: an inner end surface 9 that faces the winding core portion 2 side: and an outer end surface 10 on a side opposite to the inner end surface 9. The top plate 6 is joined to the top surface 8 of each of the first flange portion 3 and the second flange portion 4. A notch-shaped recess 11 is provided at each of both end portions of the bottom surface 7 of each of the first flange portion 3 and the second flange portion 4. The recess 11 may not be provided depending on the form of the terminal electrode.

With reference to FIG. 5, the coil component 1 includes a first wire 13 and a second wire 14 which are spirally wound around the winding core portion 2. As described above, the second wire 14 is not illustrated in FIG. 5, but is denoted by the reference numeral "14" for convenience of description. These wires 13 and 14 have, for example, a linear central conductor made of copper and an insulating coating layer covering the peripheral surface of the central conductor. The insulating coating layer is preferably made of a resin containing at least an imide bond such as polyamide-imide or imide-modified polyurethane.

Although not illustrated, the first wire 13 and the second wire 14 are wound in the same direction while being parallel to each other. At this time, the wires 13 and 14 may be wound in a state of being alternately arranged in the axial direction of the winding core portion 2 and arranged in parallel with each other even if the wires 13 and 14 are wound in two layers such that one of the wires 13 and 14 is on the inner layer side and the other is on the outer layer side.

The coil component 1 further includes a first terminal electrode 15, a second terminal electrode 16, a third terminal electrode 17, and a fourth terminal electrode 18. Although not illustrated in FIG. 5, the fourth terminal electrode 18 is denoted by the reference numeral "18" for convenience of description. Among these terminal electrodes 15 to 18, the first terminal electrode 15 and the third terminal electrode 17 are attached to the first flange portion 3 with an adhesive interposed therebetween, and the second terminal electrode 16 and the fourth terminal electrode 18 are attached to the second flange portion 4 with an adhesive interposed therebetween.

The first terminal electrode 15 and the fourth terminal electrode 18 have the same shape as each other, and the second terminal electrode 16 and the third terminal electrode 17 have the same shape as each other. Further, the first terminal electrode 15 and the third terminal electrode 17 have a plane-symmetrical shape with each other, and the second terminal electrode 16 and the fourth terminal electrode 18 have a plane-symmetrical shape with each other. Therefore, among the terminal electrodes 15 to 18, the details of the first terminal electrode 15 will be described, and the details of the other terminal electrodes 16 to 18 will be omitted.

The first terminal electrode 15 is usually manufactured by pressing a single metal plate made of, for example, a copper-based alloy such as phosphor bronze or tough pitch copper. The first terminal electrode 15 includes a base portion 19 extending along the outer end surface 10 of the first flange portion 3, and a mounting portion 20 extending along the bottom surface 7 of the first flange portion 3 from the base portion 19 with a bent portion interposed therebetween. The mounting portion 20 is a portion that is electrically and mechanically connected to a conductive land on a mounting board by soldering or the like when the coil component 1 is mounted on the mounting board (not illustrated).

Further, the first terminal electrode 15 includes a rising portion 21 extending from the mounting portion 20 with a bent portion interposed therebetween, and a receiving portion 22 extending from the rising portion 21 with a next bent portion interposed therebetween (in FIG. 5, a bent portion in the second terminal electrode 16 is illustrated). The rising portion 21 and the receiving portion 22 are located in the recess 11. The receiving portion 22 is a portion that connects the end portion of the first wire 13 to the first terminal electrode 15.

The reference numerals 19, 20, 21, and 22 which are used to respectively refer to the base portion, the mounting portion, the rising portion, and the receiving portion of the first terminal electrode 15 described above are also be used to respectively refer to the corresponding portions of the second to fourth terminal electrodes 16 to 18, as needed.

A first end of the first wire 13 described above is connected to the receiving portion 22 of the first terminal electrode 15, and a second end of the first wire 13, which is opposite to the first end, is connected to the receiving portion 22 of the second terminal electrode 16. On the other hand, a first end of the second wire 14 is connected to the receiving portion 22 of the third terminal electrode 17, and a second end of the second wire 14, which is opposite to the first end, is connected to the receiving portion 22 of the fourth terminal electrode 18.

For example, laser welding is applied to the connection. In FIG. 5, a weld block portion 13*a* formed at a connection portion between the first end of the first wire 13 and the receiving portion 22 of the first terminal electrode 15, a weld block portion 13*b* formed at a connection portion between the second end of the first wire 13 and the receiving portion 22 of the second terminal electrode 16, and a weld block portion 14*a* formed at a connection portion between the first end of the second wire 14 and the receiving portion 22 of the third terminal electrode 17 are illustrated.

On the outer end surface 10 of the first flange portion 3, a convex step portion 23 which extends along a ridgeline where the top surface 8 and the outer end surface 10 intersect is provided on the top surface 8 side. Also on the outer end surface 10 of the second flange portion 4, a convex step portion 23 is provided on the top surface 8 side. A stepped surface 24 formed by the step portion 23 is higher than a region other than a region where the step portion 23 is provided on the outer end surface 10, that is, is located to protrude in the length direction L, so that a base portion 19 of each of the terminal electrodes 15 to 18 does not protrude from the flange portions 3 and 4 in the length direction L of the winding core portion 2.

Figure 2:
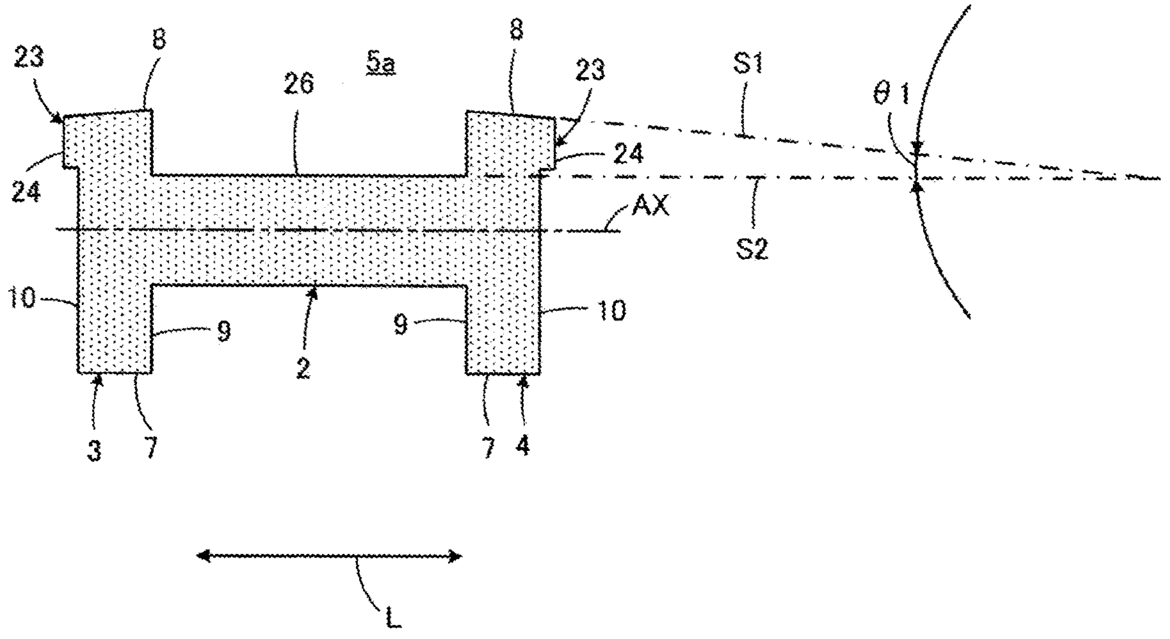
FIG. 2 is a sectional view of the winding core illustrated in FIG. 1 and is a diagram for describing an inclination of a top surface of each of flange portions.

The winding core portion 2 of the winding core 5*a* having the above-described configuration has an upper surface 26 facing substantially the same direction as the top surface 8 of each of the flange portions 3 and 4. In the winding core 5*a*, as illustrated in FIG. 2, when viewed on a virtual plane (that is, on the paper of FIG. 2) in which a central axis AX of the winding core portion 2 is located and which extends in a direction orthogonal to the bottom surface 7, on the second flange portion 4 side, a first straight line S1 passing through the top surface 8 and a second straight line S2 passing through the upper surface 26 of the winding core portion 2 intersect outside the outer end surface 10 at an angle θ1 of 0.3 degrees or more and 5 degrees or less (i.e., from 0.3 degrees to 5 degrees). The first flange portion 3 and the second flange portion 4 have a symmetrical shape, and the top surface 8 of the first flange portion 3 is similarly inclined. The inclination in the first flange portion 3 and the inclination in the second flange portion 4 may be the same or different from each other.

As illustrated in FIG. 5, the top plate 6 is passed between the top surface 8 of the first flange portion 3 and the top surface 8 of the second flange portion 4, but if a lower surface of the top plate 6 is flat, a gap may be formed between the lower surface of the top plate 6 and the inclined top surfaces 8. However, since this gap is extremely small and is filled with an adhesive, the gap does not cause a serious problem.

In order to manufacture the winding core 5*a* described above, for example, the following processes are carried out.

First, ceramic powders such as ferrite powders or alumina powders are prepared, and the ceramic powders are pressure-molded to produce a molded body containing the ceramic powders. In this molding process, for example, a powder molding apparatus 30 of which the main part is illustrated in FIG. 3 is used.

Figure 3:
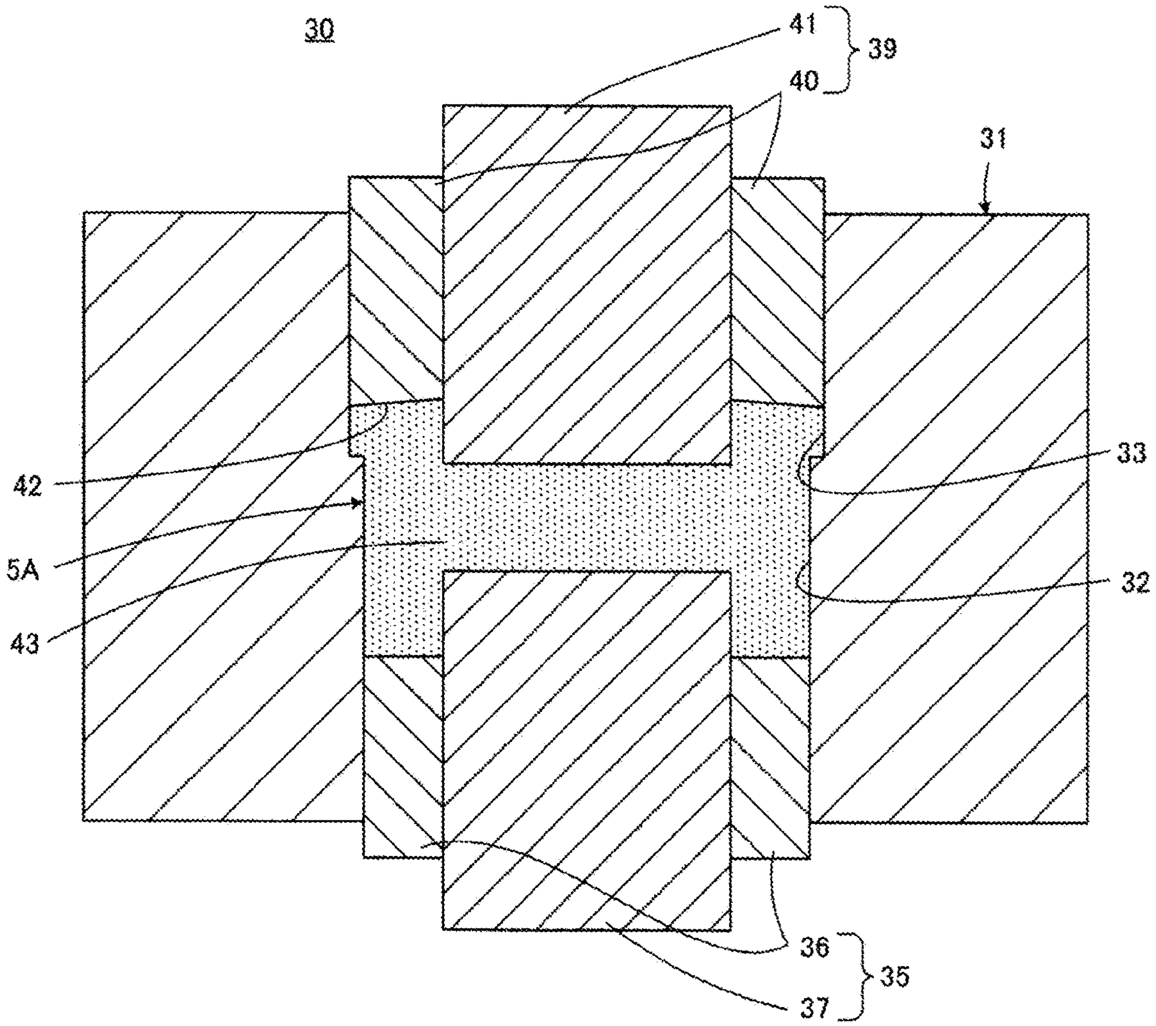
FIG. 3 is a sectional view illustrating a main part of a powder molding apparatus for the winding core illustrated in FIG. 1.

As illustrated in FIG. 3, the powder molding apparatus 30 includes a die 31, a lower punch assembly 35, an upper punch assembly 39, and a feeder (not illustrated).

In the die 31, a cavity 32 penetrating in a height direction H is formed. The opening of the cavity 32 has substantially the same H shape as the planar shape of the winding core 5*a* when viewed from the height direction H. A step portion 33 corresponding to the step portion 23 is provided on a side wall defining the cavity 32 in the die 31.

The lower punch assembly 35 has a structure divided into a first lower punch 36 for molding the flange portion and a second lower punch 37 for molding the winding core portion. The first lower punch 36 and the second lower punch 37 are lowered and raised by different drive sources, respectively.

The upper punch assembly 39 has a structure divided into a first upper punch 40 for molding the flange portion and a second upper punch 41 for molding the winding core portion. The first upper punch 40 and the second upper punch 41 are lowered and raised by different drive sources, respectively. The first upper punch 40 for molding the flange portion is provided with an inclined surface 42 corresponding to the inclination of the top surface 8 of each of the flange portions 3 and 4.

The powder molding apparatus 30 is a multi-axis press type (multi-stage press type) powder molding apparatus, and for example, the punches 36, 37, 40 and 41 are independently driven while the die 31 is fixed. The following processes are carried out by the powder molding apparatus 30.

First, ceramic powders 43 are supplied into the cavity 32 from the feeder (not illustrated), and the lower punch assembly 35 is lowered by a predetermined amount with respect to the die 31. As a result, the cavity 32 is filled with the ceramic powders 43 in excess of the final desired filling amount.

Subsequently, the lower punch assembly 35 is raised with respect to the die 31, the excess ceramic powders 43 are pushed back into the feeder, and the cavity 32 is densely filled with the ceramic powders 43.

The upper punch assembly 39 is then moved downward to enter the cavity 32. At this time, in order to prevent the ceramic powders 43 from sticking out, the lower punch assembly 35 is moved downward with respect to the die 31 before the upper punch assembly 39 enters the cavity 32.

The ceramic powders 43 filled in a closed space surrounded by the lower punch assembly 35, the upper punch assembly 39, and the die 31 are then pressurized by the lower punch assembly 35 and the upper punch assembly 39 by the first and second lower punches 36 and 37 and the first and second upper punches 40 and 41 being moved closer each other, so that a molded body 5A that should be the winding core 5*a* is obtained. The step portion 23 is formed on each of the flange portions 3 and 4 in the molded body 5A, and an inclination is given to the top surface 8 of each of the flange portions 3 and 4.

The lower punch assembly 35 and the upper punch assembly 39 are then moved upward with respect to the die 31 to bring the molded body 5A out of the die 31. Then, the lower punch assembly 35 and the upper punch assembly 39 are separated from each other, so that the molded body 5A is taken out.

Next, the molded body 5A is fired in a baking furnace. By this firing, the winding core 5*a* is obtained. Subsequently, if necessary, barrel polishing is performed on the winding core 5*a* to remove burrs from the winding core 5*a*, so that the outer surface (particularly corners and ridges) of the winding core 5*a* has curved roundness.

In the process of pressurizing the ceramic powders 43 by the lower punch assembly 35 and the upper punch assembly 39 in the powder molding apparatus 30 described above, for example, a condition in which the pressurization by the upper punch assembly 39 is stronger than the pressurization by the lower punch assembly 35 is applied.

As a result, it is possible to increase the molding density on the inner end surface 9 side on the top surface 8 side of each of the flange portions 3 and 4 where the molding density tends to be decreased.

As a result, the molding density on the inner end surface 9 side on the top surface 8 side of each of the flange portions 3 and 4 can be made close to the molding density on the outer end surface 10 side. Therefore, when the molded body 5A, which should be the winding core 5*a*, is sintered to become a sintered body, the difference between the contraction force on the inner end surface 9 side and the contraction force on the outer end surface 10 side of each of the flange portions 3 and 4 is small, and therefore, it is possible to prevent undesired deformation of the winding core 5*a* provided with the step portion 23 on the outer end surface 10 of each of the flange portions 3 and 4.

In the pressurizing process described above, it is preferable that the respective punches 36, 37, 40 and 41 are independently driven as in the illustrated powder molding apparatus 30. In particular, for the second lower punch 37 and the second upper punch 41 for molding the winding core portion, it has been found that, when molding is performed under a condition in which the pressurization by the second upper punch 41 is stronger than the pressurization by the second lower punch 37, the difference between the molding density on the inner end surface 9 side and the molding density on the outer end surface 10 side on the top surface 8 side of each of the flange portions 3 and 4 can be further reduced.

The method of reducing the difference between the molding density on the inner end surface 9 side and the molding density on the outer end surface 10 side on the top surface 8 side of each of the flange portions 3 and 4 is not limited to the above-described method, and other methods may be used.

Figure 4:
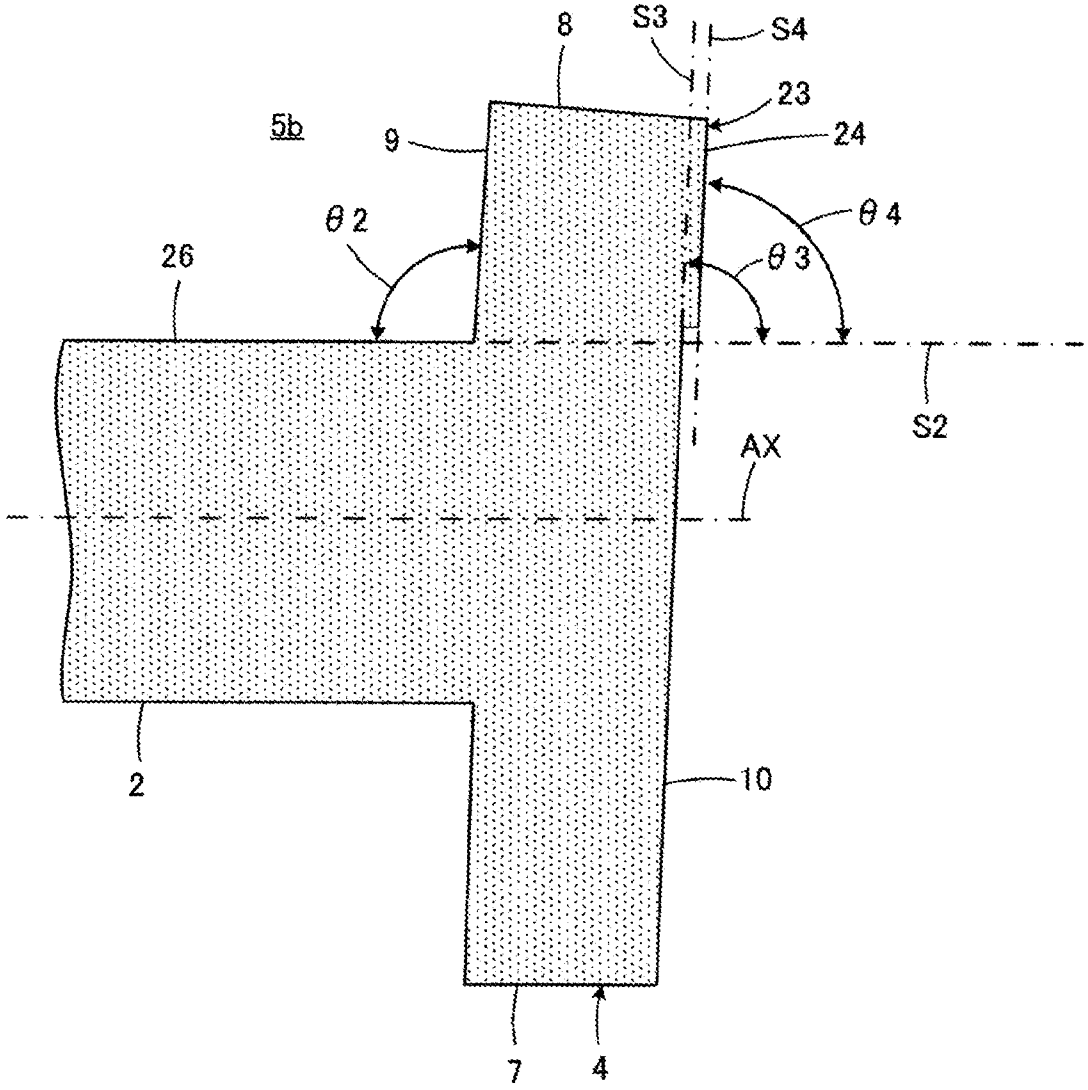
FIG. 4 is an enlarged sectional view illustrating a part of a winding core portion and a second flange portion of a winding core according to a second embodiment of the disclosure.

FIG. 4 is an enlarged sectional view illustrating a part of the winding core portion 2 and the second flange portion 4 of a winding core 5*b* according to a second embodiment of the disclosure. In FIG. 4, the same reference numerals are given to the elements corresponding to the elements illustrated in FIGS. 1 and 2, and duplicate description will be omitted.

The winding core 5*b* has the following features in addition to the above-described feature of the winding core 5*a*, that is, the feature that the top surface 8 is inclined. The following description is given in relation to the second flange portion 4 of the winding core 5*b*, but since the first flange portion 3 and the second flange portion 4 are symmetrical with each other, the description of the first flange portion 3 will be omitted. However, the first flange portion 3 and the second flange portion 4 are not necessarily perfectly symmetrical with each other, and may be substantially symmetrical, and for example, for each angle described below, the first flange portion 3 and the second flange portion 4 may be different from each other with a slight difference.

The first feature is that when the winding core 5*b* is viewed on a virtual plane (that is, on the paper of FIG. 4) in which the central axis AX of the winding core portion 2 is located and which extends in a direction orthogonal to the bottom surface 7, the inner end surface 9 of the second flange portion 4 and the upper surface 26 of the winding core portion 2 form an internal angle θ2 exceeding 90 degrees. The angle θ2 is preferably 95 degrees or more and 110 degrees or less (i.e., from 95 degrees to 110 degrees), and more preferably 104 degrees or more and 108 degrees or less (i.e., from 104 degrees to 108 degrees).

By selecting the angle θ2 in this way, it is possible to reduce the external force applied to the second flange portion 4 when the upper punch assembly 39 illustrated in FIG. 3, particularly the second upper punch 41, is pulled out from the die 31, and therefore, the undesired stress accumulated in the second flange portion 4 can be reduced, so than the damage received by the second flange portion 4 can be reduced. As a result, the occurrence of unintended deformation in the second flange portion 4 can be further reduced. Further, although the angle θ2 exceeds 90 degrees, by setting the angle θ2 to 108 degrees at the maximum, it is possible to secure a predetermined area or more on each of the upper surface 26 of the winding core portion 2 and the top surface 8 of the second flange portion 4.

The second feature is that when the winding core 5*b* is viewed on a virtual plane (that is, on the paper of FIG. 4) in which the central axis AX of the winding core portion 2 is located and which extends in a direction orthogonal to the bottom surface 7, a third straight line S3 passing through the outer end surface 10 excluding the step portion 23 of the second flange portion 4 and the second straight line S2 passing through the upper surface 26 of the winding core portion 2 form an angle θ3 of less than 90 degrees on the outer end surface 10 side and the top surface 8 side. The angle θ3 is preferably 85 degrees or more and 89.9 degrees or less (i.e., from 85 degrees to 89.9 degrees).

The third feature is that when the winding core 5*b* is viewed on a virtual plane (that is, on the paper of FIG. 4) in which the central axis AX of the winding core portion 2 is located and which extends in a direction orthogonal to the bottom surface 7, a fourth straight line S4 passing through the stepped surface 24 formed by the step portion 23 of the second flange portion 4 and the second straight line S2 passing through the upper surface 26 of the winding core portion 2 form an angle θ4 of less than 90 degrees on the outer end surface 10 side and the top surface 8 side. The angle θ4 is preferably 85 degrees or more and 89.9 degrees or less (i.e., from 85 degrees to 89.9 degrees).

By selecting the angle θ3 and the angle θ4 in this way, it is possible to reduce the external force applied to the second flange portion 4 when the molded body 5A and the upper punch assembly 39 illustrated in FIG. 3, particularly the first upper punch 40, is pulled out from the die 31, and therefore, the undesired stress accumulated in the second flange portion 4 can be reduced, so than the damage received by the second flange portion 4 can be reduced. As a result, the occurrence of unintended deformation in the second flange portion 4 can be further reduced.

In the second embodiment described above, for the first, second, and third features, only two features or only one feature among these three features may be provided.

Although the disclosure has been described above in relation to the illustrated embodiments, various other modifications are possible within the scope of the disclosure.

For example, the coil component to which the disclosure is directed may constitute a single coil, or constitute a differential mode choke coil, a transformer, a balun, or the like, in addition to the one constituting the common mode choke coil as in the illustrated embodiments. Therefore, the number of wires can also be changed according to the function of the coil component, and accordingly, the number of terminal electrodes provided on each flange portion can be changed.

Further, the terminal electrode may be a terminal electrode made of a baked conductor film, or a terminal electrode made of a baked conductor film and a plating film on the baked conductor film, in addition to the one made of a metal plate.

Further, the top plate 6 illustrated in FIG. 5 may be replaced by a coating made of resin, or the top plate may not be provided.

Further, in constructing the winding core and the coil component according to the disclosure, partial replacement or combination of configurations is possible between the different embodiments described in this specification.

What is claimed is:

1. A winding core made of ceramics, the winding core comprising:

a winding core portion extending in a length direction; and a first flange portion and a second flange portion which are respectively provided at a first end portion and a second end portion of the winding core portion in the length direction, wherein each of the first flange portion and the second flange portion includes a bottom surface that faces a mounting board side at a time of mounting, a top surface opposite to the bottom surface, the top surface including a flat part, an inner end surface that faces the winding core portion side, and an outer end surface opposite to the inner end surface, a convex step portion is provided on a top surface side of the outer end surface at a flange portion among the first flange portion and the second flange portion, the winding core portion has an upper surface facing substantially the same direction as a direction in which the top surface of the flange portion faces, and on a virtual plane which includes a central axis of the winding core portion and which extends in a direction orthogonal to the bottom surface of the flange portion, a first straight line passing through the entire flat part of the top surface of the flange portion and a second straight line passing through the upper surface of the winding core portion intersect at an angle of from 0.3 degrees to 5 degrees outside the outer end surface of the flange portion.

2. The winding core according to claim 1, wherein when viewed on the virtual plane, the inner end surface of the flange portion and the upper surface of the winding core portion define an angle exceeding 90 degrees.

3. The winding core according to claim 2, wherein when viewed on the virtual plane, the inner end surface of the flange portion and the upper surface of the winding core portion define an angle of from 95 degrees to 110 degrees.

4. The winding core according to claim 3, wherein when viewed on the virtual plane, the inner end surface of the flange portion and the upper surface of the winding core portion define an angle of from 104 degrees to 108 degrees.

5. The winding core according to claim 1, wherein when viewed on the virtual plane, a third straight line passing through the outer end surface excluding the step portion of the flange portion and the second straight line define an angle of less than 90 degrees on an outer end surface side and the top surface side.

6. The winding core according to claim 5, wherein the third straight line and the second straight line define an angle of from 85 degrees to 89.9 degrees on the outer end surface side and the top surface side.

7. The winding core according to claim 1, wherein when viewed on the virtual plane, a fourth straight line passing through a stepped surface of the step portion of the flange portion and the second straight line define an angle of less than 90 degrees on the outer end surface side and the top surface side.

8. The winding core according to claim 7, wherein the fourth straight line and the second straight line define an angle of from 85 degrees and 89.9 degrees on the outer end surface side and the top surface side.

9. A winding type coil component comprising:
- the winding core according to claim 1;
- a wire wound around the winding core portion; and
- a terminal electrode which is provided on each of the first flange portion and the second flange portion, and to which an end portion of the wire is connected.

10. The winding type coil component according to claim 9, further comprising:
- a top plate which is arranged to connect the top surface of the first flange portion and the top surface of the second flange portion.

11. The winding core according to claim 2, wherein when viewed on the virtual plane, a third straight line passing through the outer end surface excluding the step portion of the flange portion and the second straight line define an angle of less than 90 degrees on an outer end surface side and the top surface side.

12. The winding core according to claim 3, wherein when viewed on the virtual plane, a third straight line passing through the outer end surface excluding the step portion of the flange portion and the second straight line define an angle of less than 90 degrees on an outer end surface side and the top surface side.

13. The winding core according to claim 4, wherein when viewed on the virtual plane, a third straight line passing through the outer end surface excluding the step portion of the flange portion and the second straight line define an angle of less than 90 degrees on an outer end surface side and the top surface side.

14. The winding core according to claim 2, wherein when viewed on the virtual plane, a fourth straight line passing through a stepped surface of the step portion of the flange portion and the second straight line define an angle of less than 90 degrees on the outer end surface side and the top surface side.

15. The winding core according to claim 3, wherein when viewed on the virtual plane, a fourth straight line passing through a stepped surface of the step portion of the flange portion and the second straight line define an angle of less than 90 degrees on the outer end surface side and the top surface side.

16. The winding core according to claim 3, wherein when viewed on the virtual plane, a fourth straight line passing through a stepped surface of the step portion of the flange portion and the second straight line define an angle of less than 90 degrees on the outer end surface side and the top surface side.

17. A winding type coil component comprising:
- the winding core according to claim 2;
- a wire wound around the winding core portion; and
- a terminal electrode which is provided on each of the first flange portion and the second flange portion, and to which an end portion of the wire is connected.

18. A winding type coil component comprising:
- the winding core according to claim 3;
- a wire wound around the winding core portion; and
- a terminal electrode which is provided on each of the first flange portion and the second flange portion, and to which an end portion of the wire is connected.

19. A winding type coil component comprising:
- the winding core according to claim 4;
- a wire wound around the winding core portion; and
- a terminal electrode which is provided on each of the first flange portion and the second flange portion, and to which an end portion of the wire is connected.

20. A winding core made of ceramics, the winding core comprising:
- a winding core portion extending in a length direction; and
- a first flange portion and a second flange portion which are respectively provided at a first end portion and a second end portion of the winding core portion in the length direction,
- wherein each of the first flange portion and the second flange portion includes
  - a bottom surface that faces a mounting board side at a time of mounting,
  - a top surface opposite to the bottom surface, the top surface being a flat surface inclined from a plane parallel to the bottom surface,
  - an inner end surface that faces the winding core portion side, and
  - an outer end surface opposite to the inner end surface,
- a convex step portion is provided on a top surface side of the outer end surface at a flange portion among the first flange portion and the second flange portion,
- the winding core portion has an upper surface facing substantially the same direction as a direction in which the top surface of the flange portion faces, and
- on a virtual plane which includes a central axis of the winding core portion and which extends in a direction orthogonal to the bottom surface of the flange portion, a first straight line passing along a length of the flat surface of the flange portion and a second straight line passing through the upper surface of the winding core portion intersect at an angle of from 0.3 degrees to 5 degrees outside the outer end surface of the flange portion.

* * * * *